United States Patent [19]

Haefner

[11] Patent Number: 5,012,679

[45] Date of Patent: May 7, 1991

[54] OPTICAL SENSOR

[75] Inventor: Hans W. Haefner, Aichach-Walchshofen, Fed. Rep. of Germany

[73] Assignee: Pfister GmbH, Fed. Rep. of Germany

[21] Appl. No.: 392,623

[22] PCT Filed: Jan. 20, 1988

[86] PCT No.: PCT/DE88/00026

§ 371 Date: Jul. 11, 1989

§ 102(e) Date: Jul. 11, 1989

[87] PCT Pub. No.: WO88/05529

PCT Pub. Date: Jul. 28, 1988

[30] Foreign Application Priority Data

Jan. 21, 1987 [DE] Fed. Rep. of Germany ....... 3701548
Jan. 21, 1987 [DE] Fed. Rep. of Germany ....... 3701632

[51] Int. Cl.$^5$ .............................................. G01L 1/24
[52] U.S. Cl. ........................................ 73/800; 356/32
[58] Field of Search .......................... 73/800; 250/227; 350/32, 96.13, 96.3; 356/35.5

[56] References Cited

U.S. PATENT DOCUMENTS 4,560,016 12/1985 Ibanez et al. ...................... 73/800 X
4,671,659 6/1987 Rempt et al. ...................... 73/800 X
4,814,562 3/1989 Langston ............................ 250/227

FOREIGN PATENT DOCUMENTS 0144509 6/1985 European Pat. Off. .
2521659 12/1976 Fed. Rep. of Germany .
3541733 11/1986 Fed. Rep. of Germany .
86/05273 9/1986 World Int. Prop. O. .

OTHER PUBLICATIONS

First International Conference on Optical Fibre Sensors, 26–28 Apr. 1983, S. C. Rashleigh: "Polarimetric Sensors Exploiting the Axial Stress in High Bi-Refringence Fibers", pp. 210–213.
Journal "Technisches Messen", June 1984, "Faseroptische Sensoren", R. Kist, pp. 19.1–19.6.

Primary Examiner—Jerry W. Myracle
Attorney, Agent, or Firm—Lowe, Price, Leblanc, Becker & Shur

[57] ABSTRACT

An optical sensor uses a beam waveguide embedded in a force or pressure transmitting material, in particular an elastomer. To be used as force measuring sensor, the beam waveguide is mounted on an elastic deformable body and embedded in a material that does not undergo creep under the influence of a force.

26 Claims, 6 Drawing Sheets

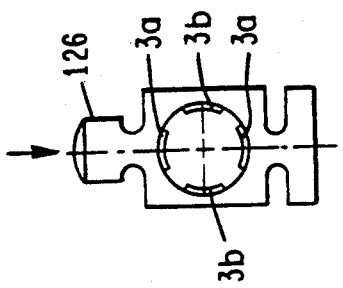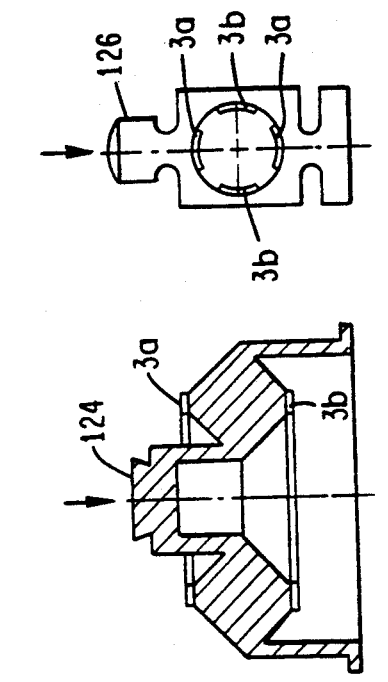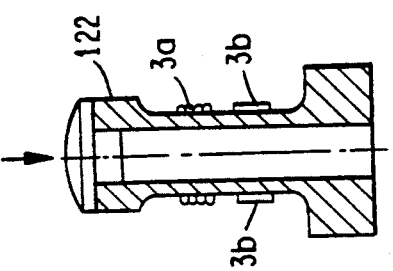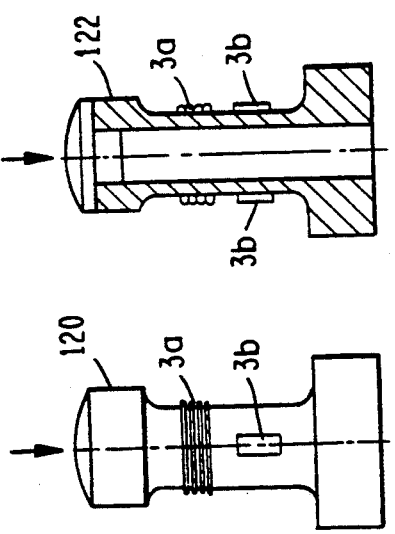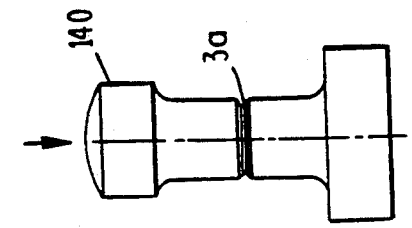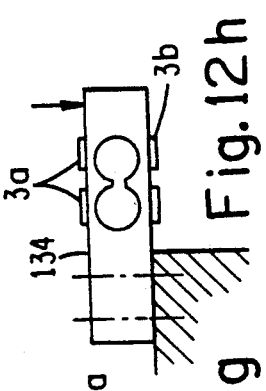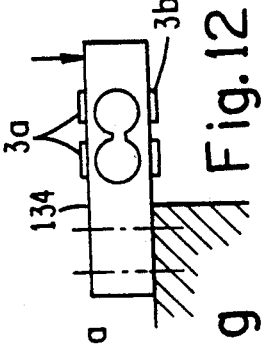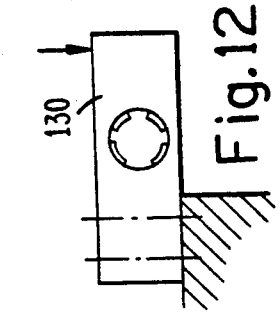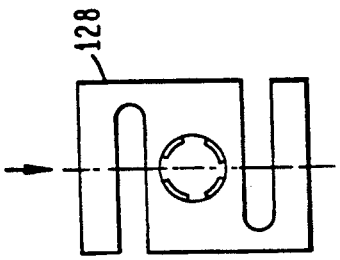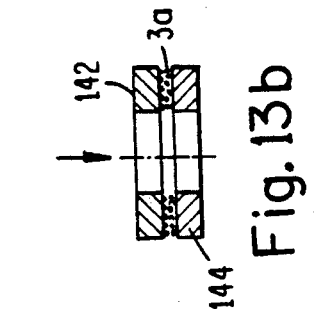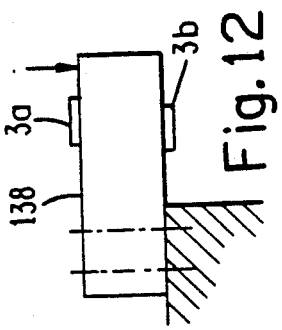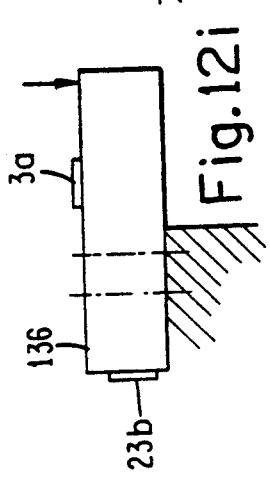

OPTICAL SENSOR

DESCRIPTION

The invention relates to an optical sensor including at least one fibre-type light wave guide changing its light transmitting characteristics in dependence on the influence of a parameter, in particular a force, a pressure or the like, these changes being used for measuring the parameter.

In the article "Faseroptische Sensoren," R. Kist in the Journal "Technisches Messen," June 1984, various applications of fibre-type light wave guides in the measuring field are disclosed and the advantages of such fibre-optical sensors are explained in detail. To be noted are the extraordinary high resolution, the simple design due to the omission of transducers and the direct digital capturing and processing of the measured signals. In this connection fibre-optical sensors are divided into multiple-wave (multimode) fibres where the measured parameter affects the intensity, the frequency or the propagation time of a light signal, and into single-wave (singlemode) fibres where predominantly the amplitude, phase and/or polarisation of the light signal is evaluated for the measurement.

The known developments restrict essentially to laboratory tests. Thus, for example, a light wave guide was immersed into liquids for measuring parameters thereof. German Patent Specification No. 35 41 733 discloses, furthermore, to metallically coat a fibre and to fix it to a carrier structure by welding or galvanically embedding. As mentioned in detail in the publication, the adherence and the temperature resistivity of such an application technique is not uncritical.

It is the object of the invention to provide a fibre-optical sensor being relatively insensitive against exterior influences and capable of being manufactured simply while having a high measuring accuracy.

By embedding the fibre-type light wave guide it is wellprotected against mechanical and chemical influences. Since the layer material completely transmits forces or pressures, respectively, to the light wave guide the measuring accuracy is relatively high.

Preferred embodiments of the optical sensor according to the invention are characterized in the subclaims.

Further features and advantages of the optical sensor according to the invention will be apparent from the following description of embodiments with reference to the drawing. There are shown FIG. 1 a schematical diagram for explaining the principle of the optical sensor according to the invention, FIG. 2 a plan view of a first embodiment of an optical sensor according to the invention, FIG. 3 a schematic elevational view of the optical sensor according to FIG. 2 in section, FIG. 4 a plan view of a further embodiment of the sensor according to the invention, FIG. 5 an elevational view of the sensor according to FIG. 4, FIG. 6 embodiment of another type of optical sensor according to the invention in section, FIG. 7 a plan view of an essential part of the sensor according to FIG. 6, FIG. 8 an embodiment of an optical sensor according to the invention modified as compared with that FIG. 6 in section, FIG. 9 a force measuring carpet using optical sensors connected optically in series, FIG. 10 a particularly preferred light wave guide combination, FIG. 11 a two-beam interferometer according to Mach-Zehnder in a different embodiment, FIGS. 12a-12j various embodiments of optical force-measuring sensors where the light wave guides are applied to various elastically deformable bodies, and FIGS. 13a, 13b a specific embodiment of an optical force-measuring sensor according to the invention in two elevational views.

In FIG. 1, the principle of an optical sensor according to the invention is illustrated as an example, functioning as a so-called Mach-Zehnder sensor.

Light from a monochromatic light source 1, such as a laser diode, is applied through a polarizer 2 to a coupler 4a for splitting the light to a measuring light wave guide 3a and a reference light wave guide 3b. The light exiting from the two light wave guides 3a,3b is applied to a further coupler 4b, is detected in photoelectric elements 5, the electrical output signal thereof is processed in a processor 6 to an output value displayed with a display 7.

The principle described above is known. Essential for the invention is the embedding of the measuring light wave guide 3a in a force-transmitting material 10, preferably an elastomeric material transmitting a force F essentially completely to the measuring light wave guide 3a. Furthermore, the reference light wave guide 3b is arranged free from the influence from the force F. It may extend in a cavity 12 of the material 10; alternatively, the reference light wave guide 3b may be arranged exterior of the elastomeric material 10 close thereto for a temperature compensation.

The measuring principle illustrated in FIG. 1 is that of a two-beam interferometer where with the Mach-Zehnder interferometer the phase-shifting relative to the light in the reference light wave guide 3b resulting from the force F in the measuring light wave guide 3a is used for the measurement. Applying a force F changes upon a pressure from all sides of the elastomeric material 10 onto the measuring light wave guide 3a the refraction number n resulting in a corresponding phase shift. Another change in the light transmission characteristics of the measuring light wave guide 3a would be a change in length due to the force F or a strain.

The principle of the two-beam interferometer according to Mach-Zehnder as illustrated in FIG. 1 is an example only for the application of a one-wave light wave guide. Further applications are disclosed in the publications named above, including the application of multiple-wave light wave guides.

Essential for the invention is the type and manner in which the light wave guide are advantageously mounted.

FIG. 2 shows a practical embodiment of an optical sensor 20 according to the invention, preferably having a two-dimensional design, i.e. a height or thickness essentially smaller than the length and width dimension.

The sensor 20 comprises a layer of force-transmitting material, preferably elastomeric material into which a measuring light wave guide 13a is embedded in a meander-type shape as a top layer 23. As illustrated in FIG. 1, the reference light wave guide 13b extends in tubes 22 in the layer 21 in a meander-type shape as well. Thus the reference light wave guide 13b is arranged free of forces. Light wave guide cables 14,16 connect the measuring light wave guide 13a with couplers 4a and 4b, respectively, of FIG. 1. Similarly, the reference light wave guide 13b is connected to the couplers 4a,4b through light wave cables 18,19.

As may be gathered from FIGS. 2 and 3, the measuring light wave guide 13a has a considerable length. Due to the meander-type shape the length may have a value between fractions of meters and several kilometers. The reference light wave guide 13b preferably, however not necessarily, has the same length as the measuring wave guide 13a. Upon application of a force F to the surface of the layer 21 this force is completely transmitted to the measuring light wave guide 13a and the one-wave (one-mode) light propagating therein will be phase-shifted distinctely relative to the light in the reference light wave guide 13b. This phase difference may be detected with extereme accuracy resulting in a very good resolution.

The FIGS. 4 and 5 show a further embodiment of an optical sensor 30 according to the invention where a layer 21 formed of elastomeric material is arranged between two steel plates 32,34 resulting in a uniform distribution in the layer 31 of a force F acting onto the upper steel plate 32.

In distinction to the embodiments of FIGS. 2 and 3 the reference light guide 23b is arranged in a larger cavity 36 separate from the measuring light wave guide 23a and sidewise thereto. Furthermore, the measuring light wave guide 23a is arranged in a meander-type manner in two overlying intersecting windings 24 and 26 enabling a further increase in length of the measuring light wave guide 23a. The distance between the two windings may be selected such that any light coupling therebetween is avoided.

Alternatively, one of the windings 24,26 may be coupled to the output separately and have such a distance from the other winding that upon force application there is a light coupling from the true measuring light wave guide winding to the other winding which light coupling may then be used for locating the force application to the layer 31. Preferably, with such an arrangement the upper steel plate 32 would be omitted.

As with the examples according to FIGS. 2 and 3 a corresponding connection to the couplers 4a and 4b is accomplished through light guide cables 44,46,48,49.

If the measuring light wave guide and the reference light wave guide have not the same length, obviously this must be taken into account for the electronic evaluation in the processor 6.

By embedding the measuring and the reference light wave guides in the elastomeric layer super-flat measuring devices similar to conveyor belts or the like may be produced as used for the manufacturing of conveyor belts from elastomeric material as well.

Since the reference light wave guide is arranged in close to the elastomeric layer, such as in the pressure-free cavity 36 or in the passages 22 exemplary formed by tubes, temperature changes are compensated effectively.

Up to now it was assumed that the force-transmitting material into which the light wave guides are embedded is an elastomeric material preferably formed bubble-free. This may be achieved either by hardening the elastomeric material in vacuum or by centrifugal casting as will be explained thereinafter in detail.

The elastomeric material may be replaced by a material having an essentially larger hardness provided that the latter transmits the forces or pressures, respectively, exerted to the layer completely or at least uniformely. Such a material may be glass the light wave guides preferably formed of glass being embedded into a molten glass frit having a lower melting point than the light wave guides.

FIGS. 6 to 8 show a further embodiment of an optical sensor according to the invention used for a force-measuring cell as explained, for example, in the International Patent Application WO 86/03584.

In the interior of a potlike housing 52 a piston 54 is guided forming a narrow annular gap 55. A space 56 between the lower surface of the piston 54 and the bottom of the housing 52 is filled with an elastomeric material into which a measuring light wave guide 58 is embedded connected to the couplers 4a,4b (FIG. 1) through light guide cables 66,67.

A reference light wave guide 62 is arranged independently from the measuring light wave guide 58, for example, in an opening 60 formed at the bottom side of the housing 52 and closeable by means of a covering plate 64. The reference light wave guide 62 again is connected to the couplers 4a and 4b through light guide cables 68,69.

The measuring light wave guide 58 and preferably also the reference light wave guide 62 may have a considerable length between fractions of a meter and several hundred meters. The light wave guide may again be arranged in a meander-type manner in one or several layers. An alternative form would be a helical bifilar design having bent off inner ends.

The elastomeric material used with the various embodiments may preferably be silicon rubber. Further applicable materials are listed in the above-mentioned International Patent Publication WO 86/03584. For manufacturing the sensors according to the invention methods may be used explained in this publication where the hardening of the elastomeric material is done either in vacuum or accomplished by centrifugal casting. This results in the manufacture of bubble-free elastomeric material transmitting completely forces or pressures, respectively, to the measuring light wave guide 58.

Figure 1:
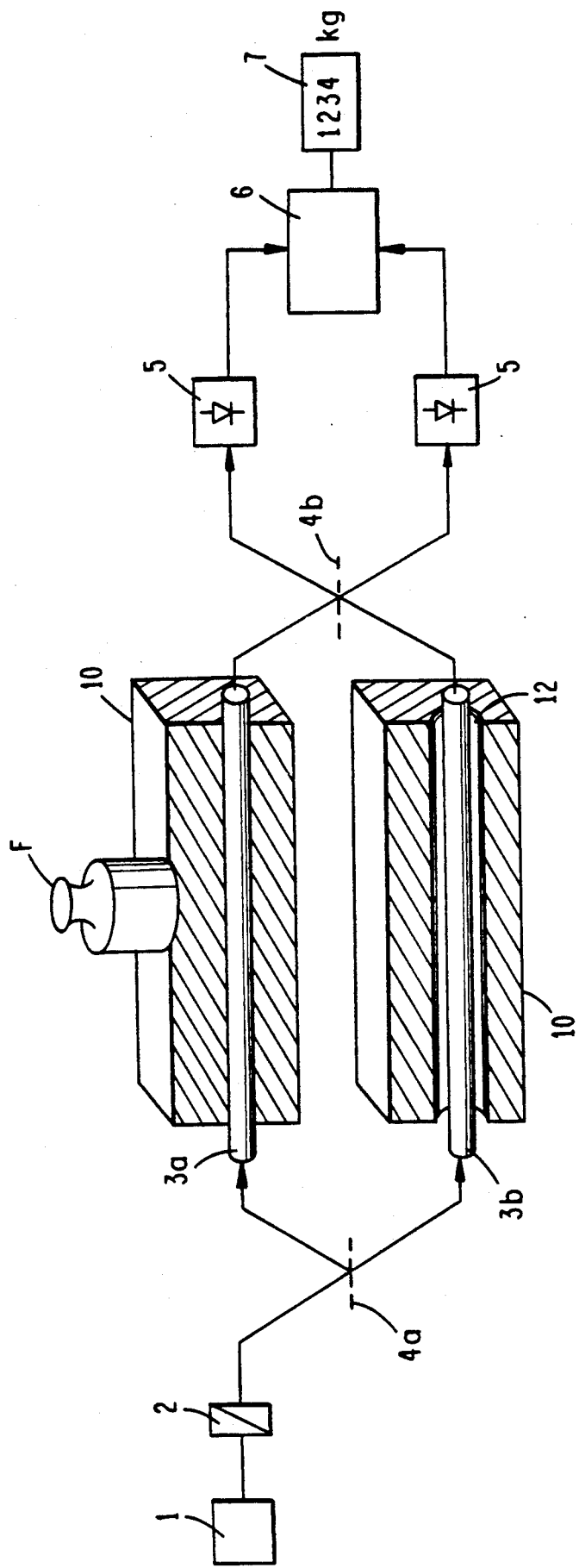
Figure 9:
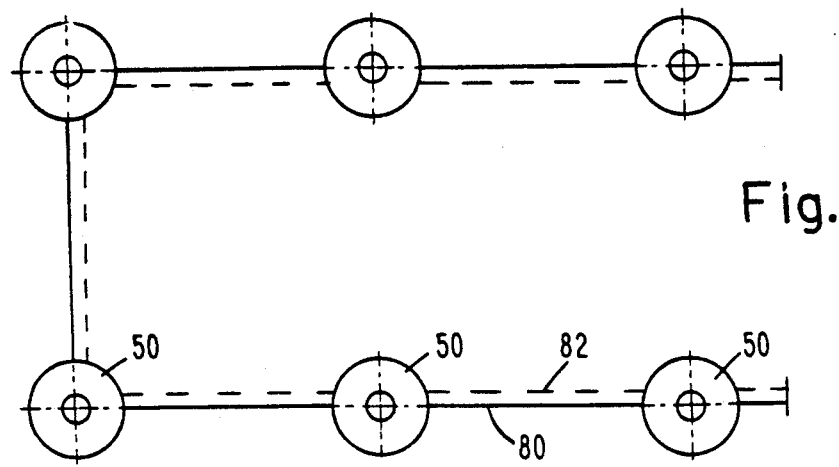
Figure 6:
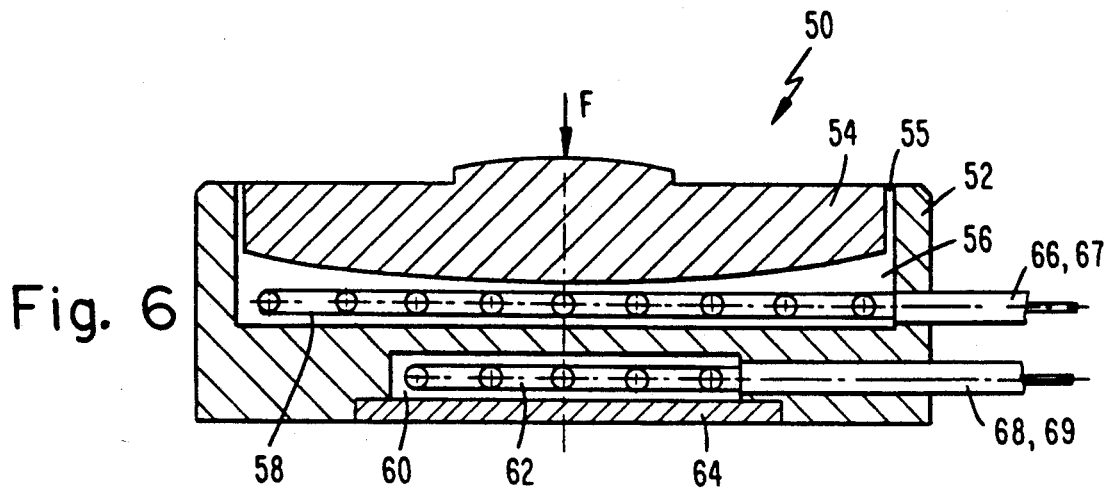
Figure 7:
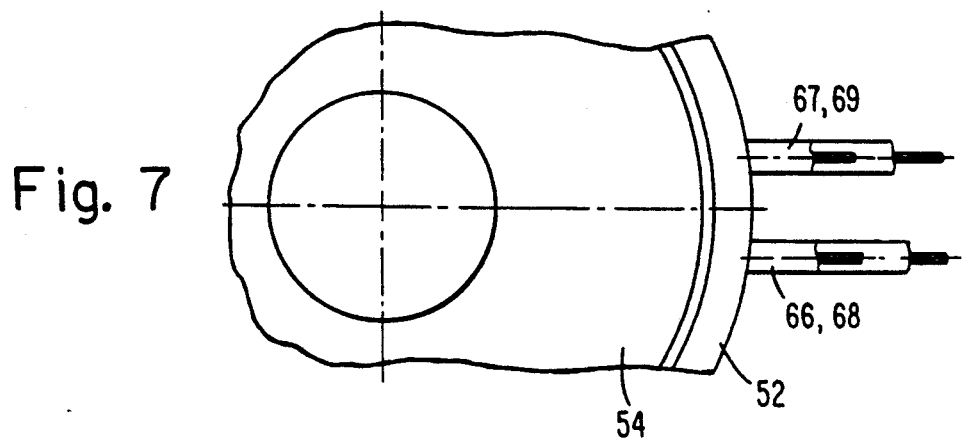
FIG. 7 shows a plan view of the embodiments according to FIGS. 6 and 8 for illustrating how the light-guide cables 66, 67, 68, 69 are led out of the device.
Figure 8:
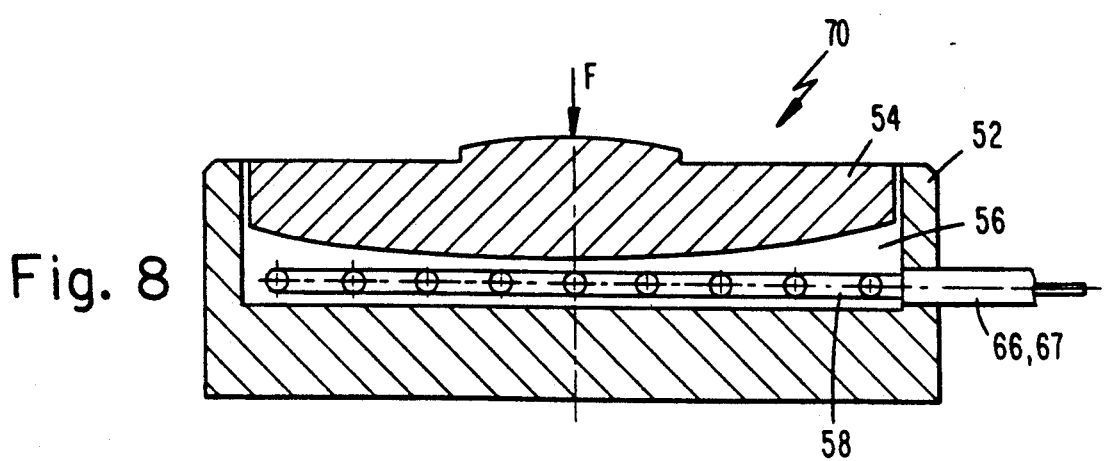
FIG. 8 shows an embodiment of an optical sensor 70 as modified in comparison to the embodiment according to FIG. 6 where the reference light wave guide has been omitted. This is possible if there is no need of a temperature compensation and the measurement is accomplished by a pulse method, such as in a multiple-wave (mode) light wave guide.

FIG. 9 shows a series connection of spacedly arranged force measuring cells comprising optical sensors according to FIGS. 6 to 8 the light wave guides are connected in series by light guide cables 80 and 82, respectively. Start and end are again connected to the couplers 4a, 4b (FIG. 1). In this manner an extended force measuring carpet may be manufactured.

Figure 10:
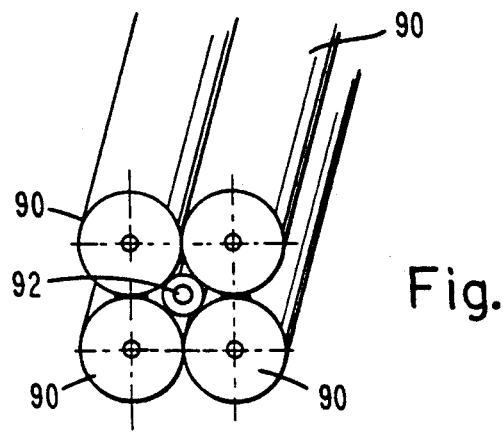
Figure 5:
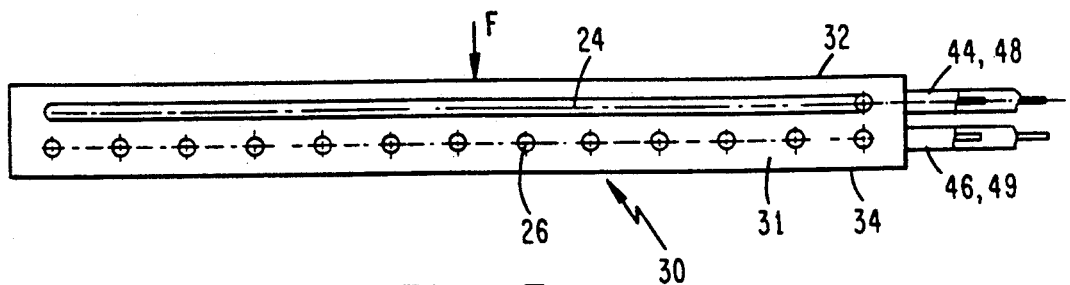
Figure 4:
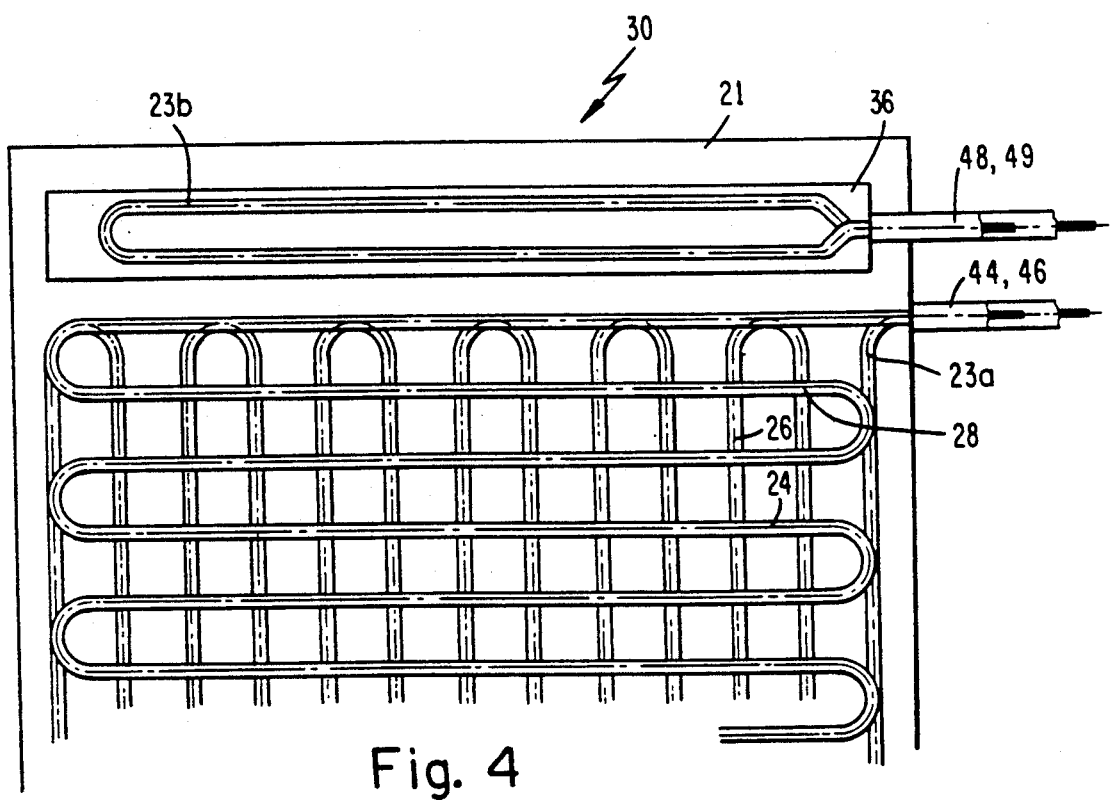

FIG. 10 shows a light wave guide design according to which at least three, in the embodiment four, light wave guides 90 are molten together with a parallel arrangement to each other. In the space formed in the center the reference light wave guide 92 may be arranged.

Such a light guide combination may be embedded in a meander-type or helical-type or the like manner instead of the measuring light wave guides. The measuring light wave guides 90 are then connected in series and there exists an exact length relation between the measuring light wave guides 90 and the reference light wave guide 92.

The outer measuring light wave guides 90 are loaded by pressure resulting in elastic tensions in longitudinal and lateral directions in the measuring light wave guides 90 changing the refraction number in these light source guides. The reference wave guide 92 is not influenced by these pressure changes.

Though in connection with FIG. 1 optical sensors using one-wave light guides have been explained any other type of light wave guides may be used as sidehole-fibres, fibres wound with wire, twisted fibres using a reference fibre not loaded by pressure. The optical measurement principle is not limited to a two-beam interferometer according to Mach-Zehnder, but the invention may be used in connection with any other measuring method.

As usual in connection with strain gauge devices for a calibration between the measuring light wave guide and the reference light wave guide for the optical sensors explained above, at a desired position there may be provided a light wave guide section preferably length-adjustable by cutting off being series-connected to the one or other light wave guide for zero-setting.

It is of importance for the invention that the light wave guides may be embedded in a simple manner in form of a web in the elastomeric material as with methods as known for the manufacturing of conveyor belts or the like. The light wave guide units may also be applied to a sheet-type substrate thereafter embedded in the elastomeric material. The meander-type arrangement may be accomplished by means of a weaving technique, i.e. by working with weft and warp.

Figure 11:
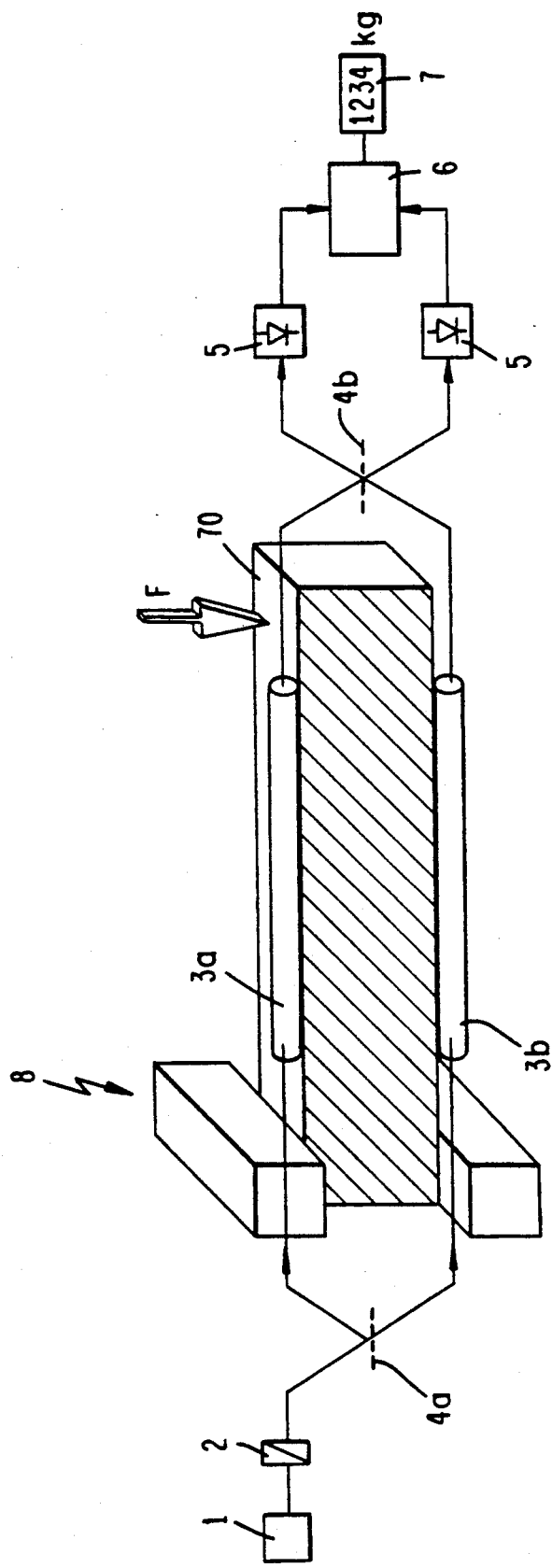

FIGS. 11 to 13 show a modification of the interferometer of FIG. 1. Here, as a modification the measuring light wave guide 3a is applied to an elastically deformable body 10 clamped at its one end in a support 8.

With the arrangement according to the invention the measuring light wave guide 3a is arranged on the topside of the body 10 whilst the reference light wave guide 3b is provided on the bottom side. This is in distinction to the known arrangement where the reference light wave guide 3b is uninfluenced by the force F exerted to the body 10.

Upon application of this force F the body 10 bends the measuring light wave guide 3a being tensioned and the reference light wave guide 3b being compressed. This results in a phase shift between the light portions propagating through the two light wave guides 3a, 3b. This phase shift is detected in the units 5, 6. A corresponding force value is calculated on the basis of this phase shift and indicated by the display 7.

As mentioned before, the reference light wave guide 3b may be arranged influenced by the force F, i.e. be arranged separate from the body 10. Alternatively, the solution according to FIG. 11 offers the opportunity to evaluate the tension and compression, respectively, of the light wave guides 3a and 3b separately and to form a difference similarly to usual resistance measuring methods. Also, the reference light wave guide 3b may be omitted if there is no need for a temperature compensation or the latter is done electronically in the processor 6. In this case the light transmission is accomplished by using a time-measuring method where the propagation time of the light pulses through the measuring light wave guide 3a is detected.

FIG. 11 only shows a straight light wave guide section for the measuring and the reference light wave guides 3a, 3b. However, according to the inVention light wave guides of considerable length may be used in the range of fractions of meters to several kilometers.

The body 10 may be a metal spring for usual strain gauge devices or may be formed of glass, ceramic, non-creeping synthetic material or polymeric concrete. Essential for the invention is the applying of the light wave guides 3a, 3b onto the body 10. This is accomplished by embedding the light wave guides in a glass mass or frit having a melting point lower than that of the light wave guides 3a, 3b.

For manufacturing the optical sensor according to the invention the light wave guide(s) 3a, 3b is (are) embedded in a molten glass mass or frit correspondingly tight in a meander-type manner in strain or tension direction, respectively, with a linear loading may be in bifilar helical manner. The glass mass being applied to the body 10. The light wave guides may be provided as a web or may be applied to a glass structure. Alternatively, the light wave guides may be applied to the surface of the body 10 and be amalgameted there by means of glass. Alternatively, the light wave guides may be applied to a sheet-type substrate preferably formed of a material evaporating during the melting step.

The manufacturing may either be in one production step where the light wave guides may be arranged as a glass structure on the body 10 and embedded there in a molten glass mass. Naturally the latter has a lower melting point than the light wave guides.

Alternatively, the production may be accomplished layer by layer, i.e. by applying a first glass layer onto the body 10, arranging the light wave guides on the glass layer and covering the light wave guides by means of a second glass mass layer.

Particularly advantageous is a production method where the body 10 is molded of non-creeping material, preferably glass, the light guide fibres being arranged in the mold for the body 10, for example on a glass structure, and are then embedded during the casting or molding process with the result of an integrated unit. In the above predominantely glass was indicated as an embedding mass. However, other materials are applicable as well as long as they do not "creep" when loaded. An example is a two-component molding resin.

After having explained the principle operation of an optical force measuring sensor according to the invention with reference to FIG. 11 solutions for a technical implementation will be explained below.

In principle, the optical force measuring sensor according to the invention may be designed similarly to known strain gauge weighing cells. In this connection it is, for example, refered to VDI-Bericht No. 312,1978 of D. Meissner and R. Suess "Beitrag zur Prüfung von DehnungsmeBstreifen-Wägezellen auf Eignung zum Einsatz in eichfähigen elektromechanischen Waagen".

The FIGS. 12a to 12j show embodiments explained in this report. Thus, FIG. 12a shows a bolt force measuring unit 120 of exemplary cylindrical form the one light wave guide 3a being wound preferably in a multiple fashion around the periphery whilst the light wave guide 3b is applied to the body exemplary in meander-type form in compression direction.

FIG. 12b shows a similar bolt force measuring unit 122 in the form of a hollow shaft with the light guide 3a wound there around and two light wave guides 3b provided in compression direction on opposite sides of the body and preferably connected in series with each other.

FIG. 12c shows a torsion ring 124 having a square-type cross section exemplary standing on one corner the light wave guide 3a being arranged in the region of the upper ring edge and the light wave guide 3b in the region of the lower ring edge.

The FIGS. 12d and 12e again show bolt force measuring units 126 and 128, respectively, where in this case light guide pairs 3a und 3b are provided in strain or tension direction, respectively, in a cylindrical opening extending normal to the force introduction direction.

Figure 2:
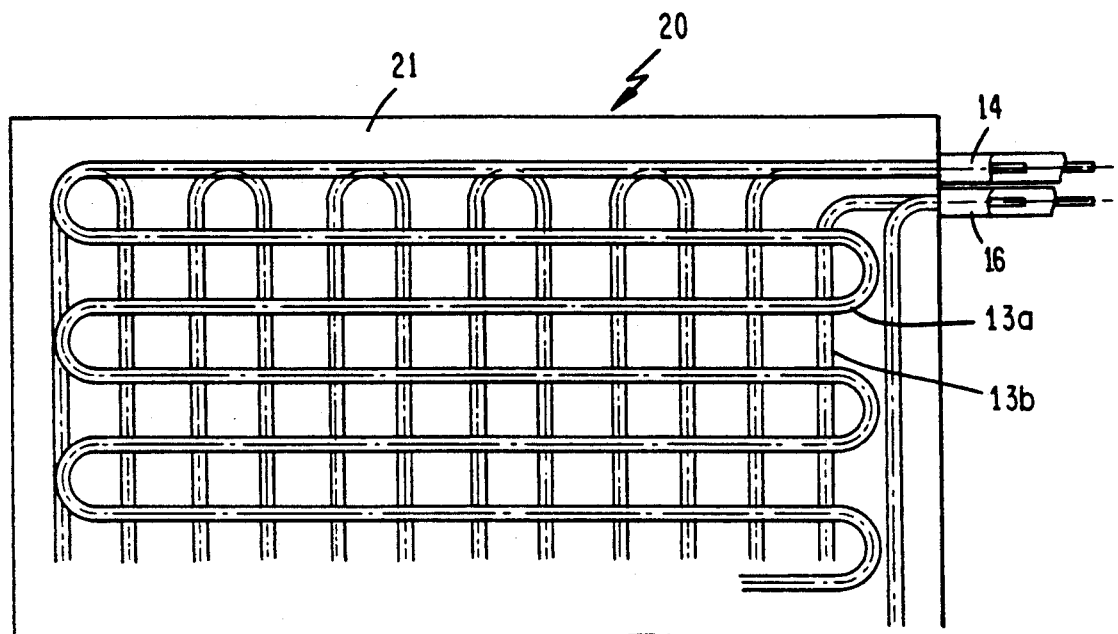
Figure 3:
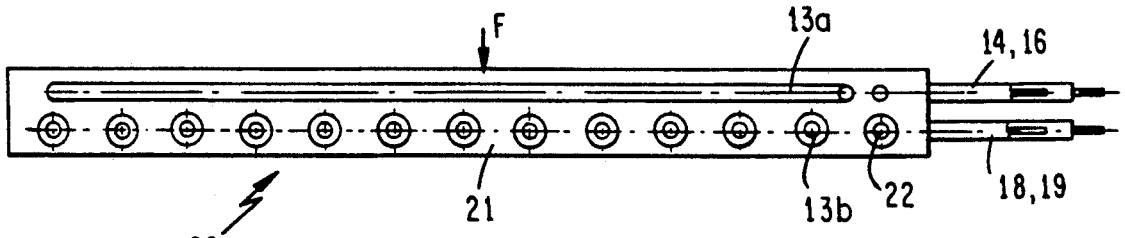

FIG. 12f illustrates a cantilever-type body 130 clamped at its one end and having a cylindrical opening in which, as with the embodiment according to FIG. 2d, light wave guide pairs 3a and 3b are arranged FIG. 12g shows a cantilever-type shearing force measuring unit 132 having light wave guides 13a and 13b arranged in a horizontally widened opening in meander-type manner at an angle 45° in respect of the force introduction direction and forming an angle of 90° with each other.

FIG. 12h shows a cantilever-type unit of the type of a parallel lever pair the cantilever 134 being provided with two cylindrical openings in horizontal close relationship to each other. The light wave guides 3a and 3b, respectively are arranged in pairs oppositely at the upper and lower sides, respectively, of the cantilever 134 at the weakest positions each.

With a further cantilever type strain gauge unit 136 only the measuring light wave guide 3a is applied in the strain or tension direction, respectively, preferably in a meander-type manner on the upper (or lower) side of the cantilever while a reference light wave guide 23b is provided on the rear side of the cantilever without force influence.

Eventually, FIG. 12j illustrates a cantilever-type strain gauge unit 138 comprising light wave guides 3a and 3b, respectively, preferably formed in a meander-type manner on the upper and lower side.

With all embodiments the light wave guides may be applied and embedded in accordance with the method according to the invention.

For evaluating the change in the light transmitting characteristics of the light wave-guides various known methods may be used as mentioned initially.

The FIGS. 13a and 13b show two different embodiments of optical force measuring sensors according to the invention. According to the embodiment of FIG. 13a a bolt force measuring unit 140 is horizontally cut through and provided with an intermediate layer having the light wave guide 3a embedded therein. Instead of a meander type arrangement of the guide with this embodiment preferably a bifilar helical arrangement may be selected consisting of one single light wave guide bent off in the middle. Furthermore, two layers with two independent light wave guides may be used comprising a meander-type arrangement each normally superposed with each other. The light wave guides are again embedded in glass or, however, in this case in an elastomeric material being as bubble-free as possible and transmitting the force exerted to the bolt completely to the light wave guide(s) 3a. The layer simultaneously forms the body 10. FIG. 13b shows a similarly functioning embodiment where the light wave guide 3a is arranged between disks, f. i. spacers 142, 144. With such an arrangement the fastening of screws to a desired pressure may be determined.

For the embodiments of FIGS. 13a and 13b the combined light wave guides according to FIG. 10 may be used as well.

As usual with strain gauge devices for a calibration between the measuring light wave guide and the reference light wave guide with the optical sensors explained above, a light wave guide section may be provided at a desired position being preferably adjustable by cutting off which section is connected in series, for example, for zero-setting, with the one or other light wave guide.

Finally, it should be mentioned that the light wave guide arrangements or units may be connected in series in a simple manner by means of light wave cables or continuations of the light wave guides. Thus, for example, several sensors spacedly arranged may be optically connected in series.

Naturally, a pressure may be measured with the optical force measuring sensors. For this purpose, the body 10 may be, for example, formed as a diaphragm to the surfaces of which the light wave guides are applied in the manner according to the invention.

What is claimed is:

1. A force measuring sensor comprising:
   a fibre-type light wave guide changing its light transmitting characteristics in response to the influence of a force or pressure, this change being used for measuring said force or pressure;
   a layer formed of force or pressure transmitting material, said light wave guide being embedded in said layer; and
   a rigid force introduction plate essentially covering one main side of a said layer and fixedly adhering thereto.

2. The force measuring sensor of claim 1, further comprising a reference light wave guide arranged close to said light wave guide without influence of the force or pressure.

3. The force measuring sensor of claim 2, wherein said reference light wave guide extends within said layer in tubelike passages pressurefree in a different level than said light wave guide.

4. The force measuring sensor of claim 2, wherein said references light wave guide extends in a pressure-free space provided in said layer.

5. The force measuring sensor of claim 1, further comprising a potlike housing in which said light wave guide is embedded in elastomeric material provided therein.

6. The force measuring sensor of claim 5, wherein said rigid force introduction plate is formed as a piston forming a narrow gap to the inner wall of said potlike housing, said gap being filled with elastomeric material.

7. The force measuring sensor of claim 6 wherein a plurality of force measuring sensors are provided as force measuring cells in spaced relationship to each other and their light wave guides and their reference light wave guides, respectively, are series connected.

8. The force measuring sensor of claim 5, wherein a recess is provided in a wall of said potlike housing containing a reference light wave guide.

9. A force measuring sensor comprising:
   a fibre-type light wave guide changing its light transmitting characteristics in response to the influence of a force or pressure, this change being used for measuring said force or pressure;

an elastically deformable measuring body having applied thereto said light wave guide; and a layer formed of material, which is substantially non-creeping upon force or pressure application, said light wave guide being embedded in said layer.

10. The force measuring sensor of claim 9, further comprising a reference light wave guide arranged close to said light wave guide without influence of the force or pressure.

11. The force measuring sensor of claim 10, wherein said reference light wave guide extends in a pressure free space provided in said layer.

12. The force measuring sensor of claim 10, wherein said measuring body is formed of castable non-creeping material and said light wave guide and said reference light wave guide are die-casted into said measuring body.

13. The force measuring sensor of claim 9, wherein said measuring body is formed of metal, ceramic, glass or silicone and said light wave guide is attached to said measuring body by means of a fixedly adhering glass layer.

14. The force measuring sensor of claim 9, wherein said measuring body is formed as a torsion ring of squarelike cross section standing at its corner, said light wave guide extending along a ring edge thereof.

15. The force measuring sensor of claim 14, wherein said light wave guide extends along said ring edge in several windings and a reference light wave guide is arranged at the opposite edge.

16. The force measuring sensor of claim 9, wherein said measuring body is separated in a plane normal to the force introduction direction and is provided with an intermediate layer having said light wave guide embedded therein.

17. A force measuring sensor including a light guide device comprising:

a three-dimensional array of at least three light wave guide fibers extending generally parallel to each other within a material and arranged in an axial direction around a reference light wave guide fiber to maintain said reference light wave guide fiber substantially free of pressure exerted on said light guide device.

18. A force measuring sensor of claim 17, wherein said at least three light wave guide fibers and said reference light wave guide fiber are melted together within said material.

19. A method of manufacturing an optical force measuring sensor comprising the steps:

providing an elastically deformable measuring body;

providing at least one light wave guide; and applying said at least one light wave guide onto said measuring body in a layer of a glass mass having a lower melting point than that of said light wave guide.

20. The method of claim 19, wherein said light wave guide is pre-fabricated in a web-type manner.

21. The method of claim 19, wherein said light wave guide is embedded into said layer prepared on a glass grid structure.

22. The method of claim 19, wherein said light wave guide is applied to said measuring body and is then covered by said layer formed of said glass mass.

23. A method of manufacturing an optical force measuring sensor comprising the steps:

providing an elastically deformable measuring body;

providing at least one light wave guide;

arranging said at least one light wave guide in a mold for said measuring body to be molded; and molding said measuring body such that said at least one wave guide is casted-in within said measuring body.

24. The method of claim 23, wherein said measuring body is molded of a non-creeping material.

25. A method of manufacturing a force measuring sensor, comprising the steps:

providing a potlike housing;

arranging a light wave guide in a bottom area of an interior of said housing;

filling elastomeric material in said interior of said potlike housing; and hardening said elastomeric material in a bubble-free way.

26. The method of claim 25 further comprising the step of placing a piston like force introduction member onto said elastomeric material in said interior of said potlike housing such that a narrow annular gap is formed between a peripheral surface of said piston and a cylindrical surface of said interior of said potlike housing said annular gap being filled with said elastomeric material.

* * * * *